(12) United States Patent
Westenberger et al.

(10) Patent No.: US 8,191,834 B2
(45) Date of Patent: Jun. 5, 2012

(54) COOLING SYSTEM ON THE BASIS OF SUCTION OF A BOUNDARY LAYER

(75) Inventors: Andreas Westenberger, Buxtehude (DE); Martin Arendt, Meine (DE); Till Marquardt, Hamburg (DE); Lars Frahm, Hamburg (DE); Geza Schrauf, Bremen (DE)

(73) Assignee: Airbus Operations GmbH (DE)

( * ) Notice: Subject to any disclaimer, the term of this patent is extended or adjusted under 35 U.S.C. 154(b) by 534 days.

(21) Appl. No.: 12/148,953

(22) Filed: Apr. 23, 2008

(65) Prior Publication Data

US 2009/0014593 A1 Jan. 15, 2009

Related U.S. Application Data

(60) Provisional application No. 60/926,389, filed on Apr. 26, 2007.

(30) Foreign Application Priority Data

Apr. 26, 2007 (DE) .......................... 10 2007 019 820

(51) Int. Cl.
*B64C 21/06* (2006.01)
(52) U.S. Cl. ...................... 244/209; 244/208; 244/53 B
(58) Field of Classification Search ................ 244/53 B, 244/209, 208; 454/71, 77; 137/15.1; 165/235
See application file for complete search history.

(56) References Cited

U.S. PATENT DOCUMENTS

| 3,126,947 | A | | 3/1964 | Jensen |
| 5,114,103 | A | * | 5/1992 | Coffinberry ................ 244/209 |
| 5,143,329 | A | | 9/1992 | Coffinberry |
| 5,535,967 | A | * | 7/1996 | Beauchamp et al. ........ 244/209 |
| 5,779,196 | A | * | 7/1998 | Timar ........................ 244/209 |
| 5,884,873 | A | * | 3/1999 | Breit ........................... 244/209 |
| 6,124,646 | A | | 9/2000 | Artinian et al. ............... 290/52 |
| 6,216,981 | B1 | * | 4/2001 | Helm ....................... 244/118.5 |
| 6,908,062 | B2 | * | 6/2005 | Munoz et al. ............. 244/118.5 |
| 7,757,994 | B2 | * | 7/2010 | Schrauf ....................... 244/209 |
| 2007/0145186 | A1 | | 6/2007 | Schmidt et al. |

FOREIGN PATENT DOCUMENTS

| DE | 10361644 | 8/2005 |
| JP | 1-293298 | 11/1989 |
| WO | WO 2005063565 A1 * | 7/2005 |

OTHER PUBLICATIONS

Schrauf et al, "Simplified Hybrid Laminar Flow Control", ECCOMAS, 2004, pp. 1-13.

* cited by examiner

*Primary Examiner* — Tien Dinh
*Assistant Examiner* — Justin Benedik
(74) *Attorney, Agent, or Firm* — Lerner, David, Littenberg, Krumholz & Mentlik, LLP

(57) ABSTRACT

A cooling system on board an aircraft includes a device for removing by suction a boundary layer, and a heat exchanger through which flows the boundary layer air that has been removed by suction. Cooling by way of a ram air channel can be reduced or entirely stopped, depending on the flight phase, such that the air drag of the aircraft and thus the fuel consumption can be reduced.

18 Claims, 3 Drawing Sheets

COOLING SYSTEM ON THE BASIS OF SUCTION OF A BOUNDARY LAYER

CROSS-REFERENCE TO RELATED APPLICATIONS

This application claims the benefit of the filing date of U.S. Provisional Patent Application No. 60/926,389 filed Apr. 26, 2007, the disclosure of which is hereby incorporated herein by reference.

BACKGROUND OF THE INVENTION

The invention relates to cooling devices in aircraft. In particular, the invention relates to a cooling system for an aircraft, an aircraft comprising such a cooling system, the use of a cooling system in an aircraft, and a method for cooling a medium in an aircraft.

In the technical field of aircraft construction and aeronautical engineering generally, for the purpose of reducing aerodynamic drag during flight, removal by suction of the so-called boundary layer, i.e. the air layer that flows directly along the aerodynamic surface areas of the aircraft, can take place. This measure is based on the laws of aerodynamics, which laws state that the aerodynamic drag of laminar boundary layer flows is significantly less than that of turbulent boundary layer flows. It is therefore possible to reduce aerodynamic drag of an aircraft during cruising in that at least some of the boundary layer flow on wing surfaces and tail unit surfaces is kept so as to be laminar. The air stream removed by suction from the boundary layer can be of a magnitude of several kilograms per second, depending on which surfaces and how many surfaces have been selected.

It has been shown that generating laminar flow may result in a significant reduction in an aircraft's air drag, and may thus result in fuel savings.

Cooling in an aircraft presently takes place predominantly by admitting outside air by way of a ram air channel, in particular for cooling the air conditioning unit. However, as a result of their openings, ram air channels may create additional air drag on the aircraft, which air drag may have a negative effect on the overall performance of the aircraft as far as fuel consumption and flight speed are concerned.

Due to the use of further electrical systems in future aircraft, it may be assumed that the required cooling output will increase. However, the cooling output provided by ram air cannot be increased indefinitely because of the resulting additional air drag.

SUMMARY OF THE INVENTION

The exemplary embodiments described below, of the cooling system, also relate to the aircraft, the use of the cooling system, and the method for cooling according to the invention.

According to an exemplary embodiment of the present invention, a cooling system for an aircraft is stated, with the cooling system comprising a device for removing by suction boundary layer air from a flow-critical surface of the aircraft, and a heat exchanger for cooling a medium, wherein the boundary layer air that has been removed by suction flows through the heat exchanger, and wherein the boundary layer air that has been removed by suction is used, or can be used, as a coolant for the heat exchanger.

In other words a cooling system for an aircraft is provided, which cooling system as a coolant uses the outside air that has been removed by suction in the boundary layer, which outside air can be at a temperature of approximately minus 40° C. at cruising altitude. The boundary layer air removed by suction thus need not be discharged directly to the outside but instead is fed to the heat exchanger in the interior of the aircraft.

In this way cooling by way of a ram air channel may be reduced or, depending on the flight phase, it may even be stopped altogether. In this way the air drag of the aircraft and thus also the fuel consumption may be significantly reduced.

The very considerable air mass flow of the boundary layer removed by suction may result in very considerable cooling output. Downstream of the heat exchanger, the air that is now heated can be given off to the outside through an aperture, which may result in a slight increase in thrust.

The cooling system may, for example, be used for cooling an air conditioning unit that has to remove heat, for cooling fuel cell systems, for cooling generators, current transformers as well as power converters and other systems associated with a need for considerable cooling output.

According to an exemplary embodiment of the present invention, the medium to be cooled is cooled directly by being connected to the heat exchanger. As an alternative, the medium to be cooled may be cooled by the heat exchanger indirectly (by way of a secondary cooling circuit). For example, a fuel cell is cooled directly by means of water or some other coolants. These coolants may then be cooled in the heat exchanger by the secondary coolant (namely by the boundary layer air that has been removed by suction).

According to a further exemplary embodiment of the present invention, the device for removing by suction the boundary layer air comprises a suction device, a pump or a compressor for removing by suction the boundary layer air.

By installing a powerful suction device, a pump or a compressor, the boundary layer suction performance and thus ultimately the cooling output of the cooling system may be increased.

The invention may provide for an increase in cooling output ultimately resulting in the ability to improve the flight characteristics of the aircraft.

According to a further exemplary embodiment of the present invention, furthermore, a bypass channel for bypassing the heat exchanger is provided.

In this way the rate of suction of the boundary layer may be increased so that consequently cooling output is increased. Likewise, in this way the cooling output may be reduced without there being a need to reduce the rate of removal by suction of the boundary layer.

According to a further exemplary embodiment of the present invention, the bypass channel comprises a bypass flap that is designed to regulate an airstream flowing through the bypass channel, so that consequently the cooling output of the cooling system may be regulated.

In this way fast, simple and effective regulating of the cooling output may be possible.

According to a further exemplary embodiment of the present invention, the cooling system further comprises a ram air channel with a control device, e.g.a. closed-loop control device, and a ram-air channel flap that is regulated by the control device, wherein the control device and the ram-air channel flap are designed to regulate the air flow flowing through the ram air channel, and wherein the air flow flowing through the ram air channel can be used as a coolant for the heat exchanger.

In this way, in addition to the boundary layer air removed by suction, ram air from the ram air channel may be used for cooling the medium in the cooling system. In this way the cooling output may at short notice and rapidly be increased in a simple and effective manner.

According to a further exemplary embodiment of the present invention, the cooling system comprises a fan in the ram air channel, which fan can take in ram air, for example when the aircraft is on the ground or when for some other reason the ram-air flow rate is to be increased.

In this way a further regulating mechanism is provided in order to vary the cooling output. Furthermore, cooling may also be provided when the aircraft is on the ground and therefore no adequate relative wind is available.

According to a further exemplary embodiment of the present invention, the cooling system is designed for cooling an air conditioning unit of the aircraft. According to a further exemplary embodiment, the cooling system may be designed for cooling a fuel cell or a fuel cell system, a generator, a current transformer, a power converter or other systems with considerable cooling requirements.

According to a further exemplary embodiment of the present invention, the suction device, the pump or the compressor for removing by suction the boundary layer air is arranged in a line near the bypass channel so that the suction device, the pump or the compressor may also be used for taking in the ram air.

In this way there may be no need to provide an additional compressor or fan in the ram air channel.

According to a further exemplary embodiment of the present invention, the suction device, the pump or the compressor is arranged in a line downstream of the heat exchanger.

Consequently, the thermal energy of the suction device, of the pump or of the compressor can be given off to the airstream only downstream of the cooling unit. Through this the cooling output of the arrangement may be improved.

According to a further exemplary embodiment of the present invention, an aircraft is stated which comprises a cooling system as described above.

According to a further exemplary embodiment of the present invention, the use of such a cooling system in an aircraft is stated.

According to a further exemplary embodiment of the present invention, a method for cooling a medium in an aircraft is stated, in which method boundary layer air from a flow-critical surface of the aircraft is removed by suction, and the boundary layer air obtained by suction flows through a heat exchanger for cooling a medium, wherein the boundary layer air can be, or is, used as a coolant for the heat exchanger.

According to a further exemplary embodiment of the present invention, the method comprises the following additional steps: bypassing the heat exchanger through a bypass channel, and regulating the cooling output of the cooling system by regulating the airstream flowing through the bypass channel.

Further exemplary embodiments of the invention are shown in the subordinate claims.

Below, exemplary embodiments of the present invention are described with reference to the figures.

Figure 1:
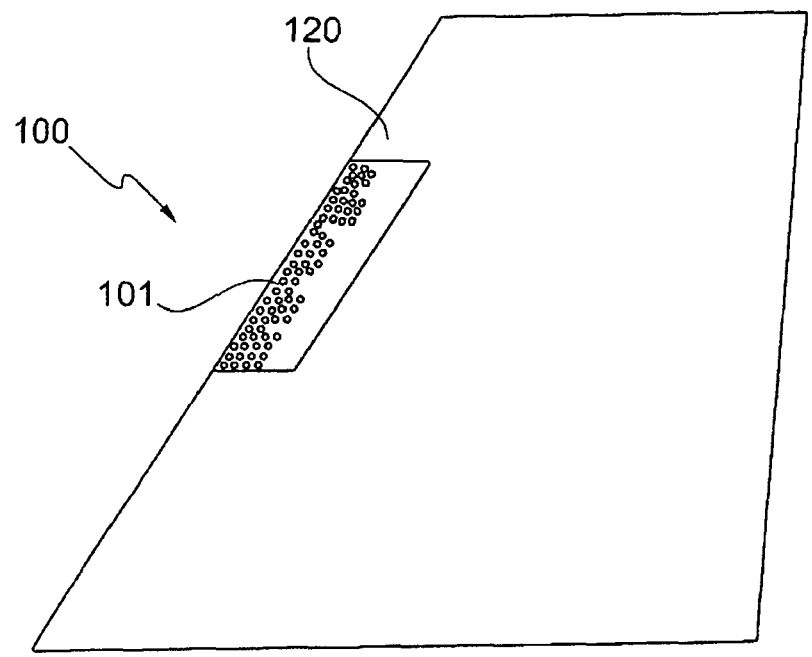
FIG. 1 shows a diagrammatic view of an aircraft wing with removal by suction of a boundary layer according to an exemplary embodiment of the present invention.

The illustrations in the figures are diagrammatic and not to scale.

In the following description of the figures the same reference characters are used for identical or similar elements.

DETAILED DESCRIPTION

FIG. 1 shows a diagrammatic view of an aircraft wing 100 comprising various suction air apertures 101 on a flow-critical surface 120 of the wing 100. The suction air apertures 101 comprise, for example, a diameter in the micrometer range and are used to remove the boundary layer by suction.

It should be noted that the suction air apertures 101 may also be arranged on other regions of the wing or on regions of the vertical- or horizontal tail unit.

Figure 2:
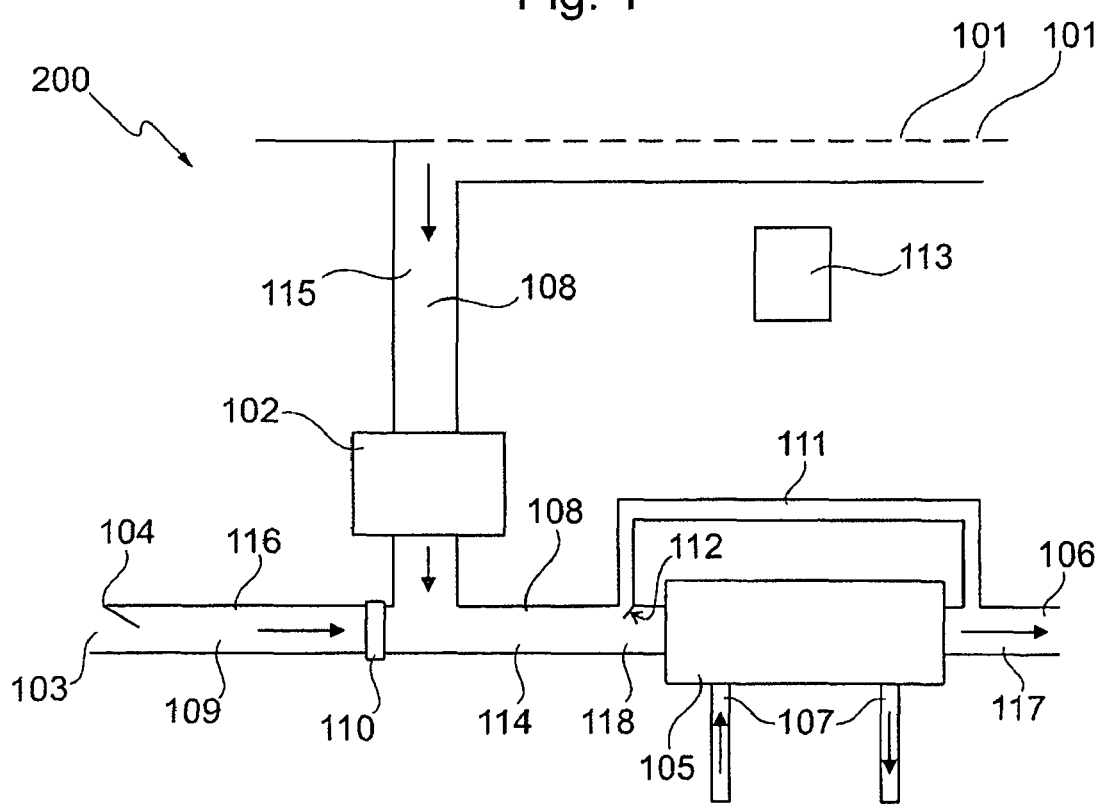
FIG. 2 shows a diagrammatic view of a cooling system according to an exemplary embodiment of the present invention.

FIG. 2 shows a diagrammatic view of a cooling system 200 according to an exemplary embodiment of the present invention. The cooling system 200 essentially comprises a device for removing by suction boundary layer air from a flow-critical surface of the aircraft, as well as a heat exchanger 105. On the one hand, the suction device comprises the various suction air apertures 101, which are, for example, arranged on the surface of the aerofoil. On the other hand, the suction device also comprises a line system 114, 115, 116, a suction device, pump, compressor or similar 102, and a closed-loop control device or a closed-loop control unit 113.

The closed-loop control device 113 is used, for example, to control or regulate the ram-air channel flap 104 and the bypass flap 112, as well as the suction output or pump output of the device 102 and the suction output or pump output of the fan or of the pump 110. The communication connection between the closed-loop control device 113 and the devices of the cooling system, which devices are to be controlled or regulated, are not shown in FIG. 2.

In the exemplary embodiment shown in FIG. 2, the suction device 102 is arranged in the air channel 115 that feeds the boundary layer that has been removed by suction, to the ram air channel 116.

At its aperture the ram air channel 116 comprises a flap 104 by way of which the ram-air channel aperture 103 may be entirely or partly opened or closed as required. To this effect the flap 104 is connected to the regulating unit 113 (not shown in FIG. 2).

The ram air 109 may also be taken in by way of the fan or the pump 110, for example when the aircraft is on the ground or when additional ram air is required in order to increase the cooling output.

Downstream of the pump or the fan 110 the ram air channel 116 and the boundary layer suction channel 115 meet. The airflows conveyed therein are fed to the heat exchanger 105 by way of the line 114. In order to bypass the heat exchanger 105, a bypass channel 111 with a bypass flap 112 is provided. The bypass flap 112 is connected to the control- or regulating unit 113 and can be set accordingly so that the generated cooling output matches the desired cooling output.

Depending on the setting of the bypass flap 112, more or less air (coolant medium) 108 removed by suction is made to bypass the heat exchanger 105.

Downstream of the exit of the heat exchanger 105 there is an ongoing line 117 with an aperture 106 for letting off the heated cooling air.

Furthermore, a primary or secondary coolant circuit comprising a medium 107 to be cooled is provided, which medium 107 passes through the heat exchanger and is cooled by the cooling air.

Since removing the boundary layer by suction is not efficient in every flight phase, the ram air channel 116 may be connected by way of the closed-loop control device 113 and the ram air channel 104 so that by way of this ram air channel 116, as an alternative or in addition to air removed by suction from the boundary layer, cooling outside air can be fed from the boundary layer to the heat exchanger 105. On the ground, this air can be fed to the heat exchanger by means of the suction device (fan 110) in the ram air channel. Furthermore, a measuring-control-regulating unit, for example in the form of the closed-loop control device 113, can be provided that determines the required data for the cooling system 200. This measuring data can, for example, be the temperature or the volume flow in one of the lines 114, 115, 116, 117 or 111. Furthermore, the closed-loop control unit 113 can be used for the suction device of the boundary layer, the fan in the ram air channel, the flap for the ram air and for the bypass channel, or the bypass channel flap 113.

For example, for this purpose temperature sensors upstream of the heat exchanger 105 are provided (see reference character 118).

Figure 3:
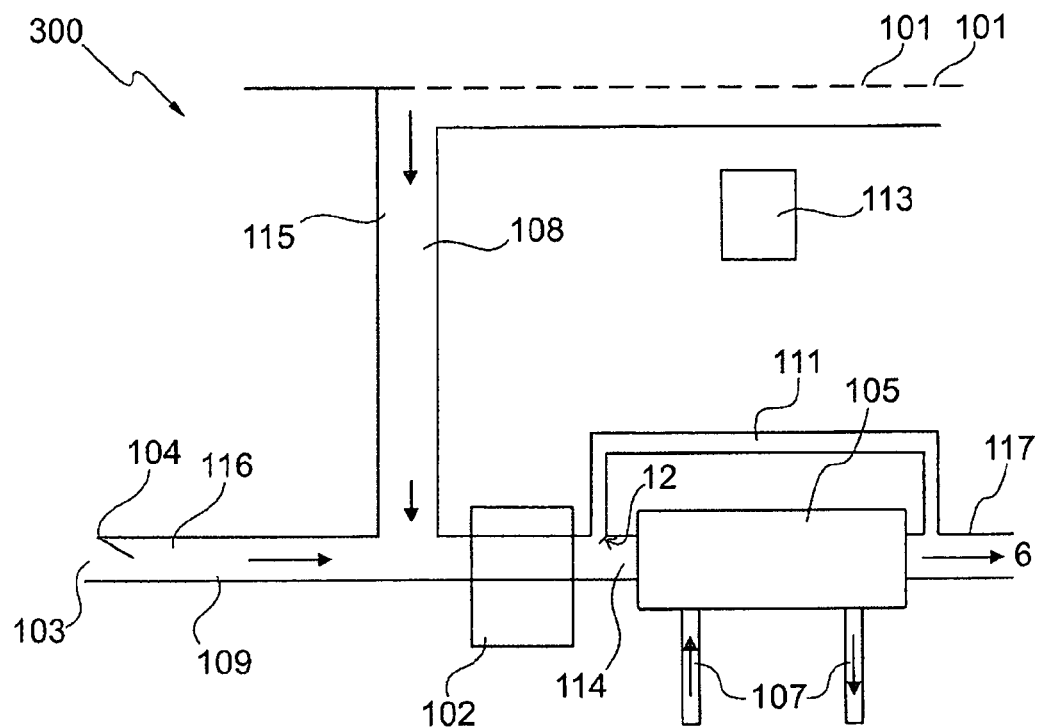
FIG. 3 shows a diagrammatic view of a cooling system according to a further exemplary embodiment of the present invention.

FIG. 3 shows a diagrammatic view of a cooling system 300 according to a further exemplary embodiment of the present invention, in which embodiment the suction device 102 is arranged in the line 114 (namely downstream of the point at which the lines 115 and 116 meet). In this way there may be no need for an additional compressor or fan 110 (see FIG. 2) and the expenditure for it can be saved because the suction device 102 can remove by suction not only the boundary layer air but also the ram air.

Figure 4:
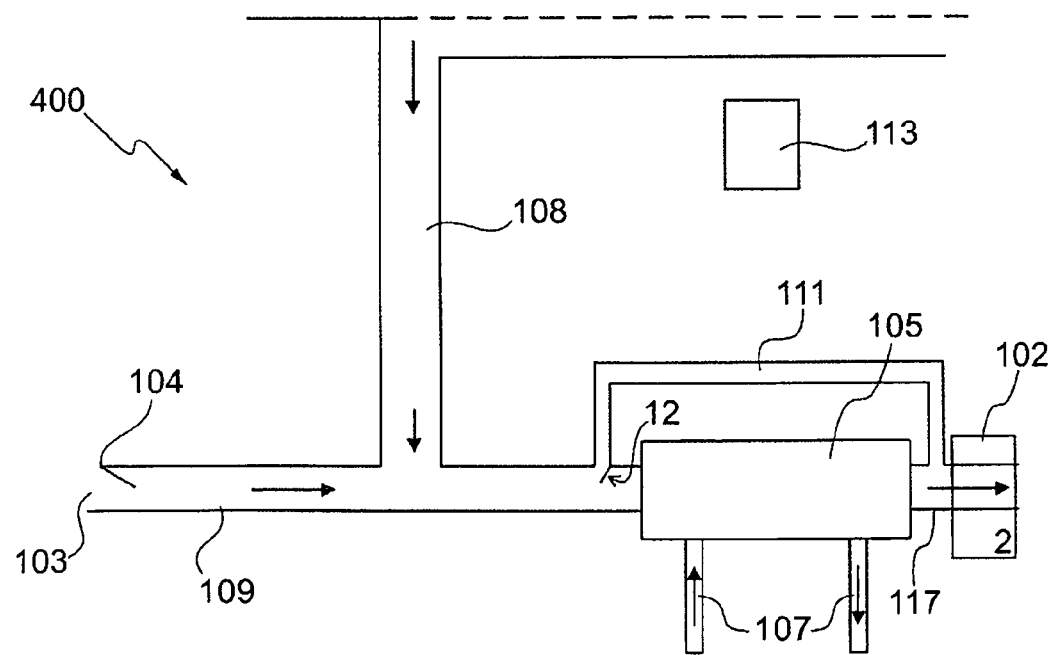
FIG. 4 shows a diagrammatic view of a cooling system according to a further exemplary embodiment of the present invention.

FIG. 4 shows a further exemplary embodiment of the cooling system 400 according to the invention. In this exemplary embodiment the suction device 102 is arranged downstream of the heat exchanger 105 in the line 117. In this way the thermal energy of the compressor or of the suction device 102 may be fed into the cooling air only downstream of the cooling unit. In this way the cooling output of the cooling system 400 may be improved.

Figure 5:
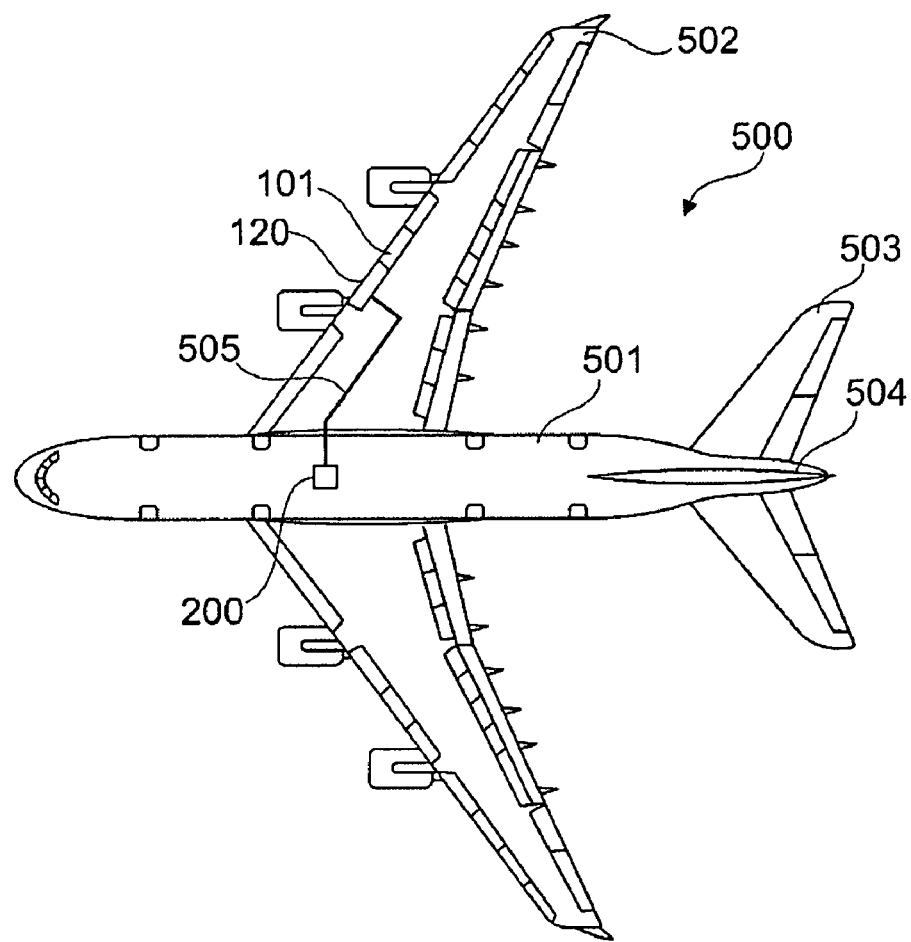
FIG. 5 shows a diagrammatic view of an aircraft comprising a cooling system according to an exemplary embodiment of the present invention.

FIG. 5 shows a diagrammatic view of an aircraft according to an exemplary embodiment of the present invention, which embodiment comprises a cooling system. The aircraft comprises a fuselage 501 and a pair of wings 502 as well as a horizontal tail unit 503 and a vertical tail unit 504. The cooling system 200 is partly incorporated in the fuselage 501 of the aircraft 500. For example, the heat exchanger 105 is situated in the fuselage of the aircraft. The heat exchanger is then connected to the suction air apertures 101 in the flow-critical surface 120 of the wing 502 by way of a line system 505. Furthermore, a ram air channel may be provided (not shown in FIG. 5).

Figure 6:
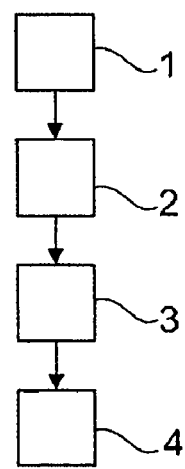
FIG. 6 shows a flow chart of a method according to an exemplary embodiment of the present invention.

FIG. 6 shows a flow chart of a method according to an exemplary embodiment of the present invention. In step 1 boundary layer air is removed by suction from a flow-critical surface of the aircraft. In step 2 the boundary layer air that has been removed by suction, flows through a heat exchanger for cooling a medium. In step 3 the heat exchanger is, at least to some extent, bypassed by way of a bypass channel, and in step 4 the cooling output of the cooling system is set by regulating the airflow that flows through the bypass channel.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A cooling system for an aircraft, the cooling system comprising:
a suction unit for removing, by suction through suction air apertures, boundary layer air from a flow-critical surface of the aircraft;
a heat exchanger for cooling a medium, through which heat exchanger the boundary layer air that has been removed by suction flows; and
a ram-air channel comprising a closed-loop control device and a ram-air channel flap regulated by the closed-loop control device,
wherein the closed-loop control device comprises a temperature sensor upstream or downstream of the heat exchanger for determining measuring data for the cooling system;
wherein the closed-loop control device and the ram-air channel flap are adapted to regulate an airstream of ram air flowing through the ram-air channel in order to add ram air flowing through the ram-air channel to the boundary layer air upstream of the heat exchanger and thus before both the ram-air and the boundary layer air are fed to the heat exchanger to increase the cooling output of the cooling system when the closed-loop control device determines from the measuring data for the cooling system that removing the boundary layer air by suction through the air apertures is not efficient enough and thus the cooling output of the cooling system has to be increased;
wherein the boundary layer air that has been removed by suction and the ram air are used as a coolant that flows through the heat exchanger.

2. The cooling system of claim 1, wherein the suction unit comprises at least one of a pump and a compressor for removing by suction the boundary layer air.

3. The cooling system of claim 1, further comprising:
a bypass channel for bypassing the heat exchanger.

4. The cooling system of claim 3,
wherein the bypass channel comprises a bypass flap that regulates an airstream flowing through the bypass channel such that the cooling output of the cooling system can be regulated.

5. The cooling system of claim 4, further comprising:
a fan in the ram-air channel.

6. The cooling system of claim 3,
wherein the suction unit is arranged in a line near the bypass channel such that the suction unit can also be used for taking in the ram air.

7. The cooling system of claim 1,
wherein the cooling system is configured for cooling an air conditioning unit of the aircraft.

8. The cooling system of claim 1,
wherein the suction unit is arranged in a line downstream of the heat exchanger.

9. An aircraft comprising a cooling system, the cooling system comprising:

a suction unit for removing, by suction through suction air apertures, boundary layer air from a flow-critical surface of the aircraft;

a heat exchanger for cooling a medium, through which heat exchanger the boundary layer air that has been removed by suction flows;

a ram-air channel comprising a closed-loop control device and a ram-air channel flap regulated by the closed-loop control device, wherein the closed-loop control device comprises a temperature sensor upstream or downstream of the heat exchanger for determining measuring data for the cooling system;

wherein the closed-loop control device and the ram-air channel flap are adapted to regulate an airstream of ram air flowing through the ram-air channel in order to add ram-air flowing through the ram-air channel to the boundary layer air upstream of the heat exchanger and thus before both the ram air and the boundary layer air are fed to the heat exchanger to increase the cooling output of the cooling system when the closed-loop control device determines from the measuring data for the cooling system that removing the boundary layer air by suction through the air apertures is not efficient enough and thus the cooling output of the cooling system has to be increased;

wherein the boundary layer air that has been removed by suction and the ram air are used as a coolant that flows through the heat exchanger.

10. A method for cooling a medium in an aircraft, comprising:

removing, by suction, boundary layer air from a flow-critical surface of the aircraft;

regulating an airstream flowing through a ram-air channel;

determining measuring data for the cooling system by a closed-loop control device comprising a temperature sensor upstream or downstream of a heat exchanger;

adding the ram-air flowing through the ram-air channel to the boundary layer air upstream of the heat exchanger and thus before both the ram-air and the boundary layer air are fed to the heat exchanger to increase the cooling output of the cooling system when the closed-loop control device determines from the measuring data for the cooling system that removing the boundary layer air by suction through the air apertures is not efficient enough and thus the cooling output of the cooling system has to be increased;

making the boundary layer air that has been removed by suction and the airstream flowing through the ram-air channel flow through the heat exchanger for cooling a medium; and wherein the boundary layer air removed by suction and the air stream flowing through the ram-air channel is used as a coolant for the heat exchanger.

11. The method of claim 10, further comprising:
bypassing the heat exchanger by way of a bypass channel; and regulating the cooling output of the cooling system by regulating an airstream through the bypass channel.

12. A fuel cell system in an aircraft, comprising a cooling system, the cooling system comprising:

a suction unit for removing, by suction through suction air apertures, boundary layer air from a flow-critical surface of the aircraft;

a heat exchanger for cooling a medium, through which heat exchanger the boundary layer air that has been removed by suction flows; and a ram-air channel comprising a closed-loop control device and a ram-air channel flap regulated by the closed-loop control device;

wherein the closed-loop control device comprises a temperature sensor upstream or downstream of the heat exchanger for determining measuring data for the cooling system;

wherein the closed-loop control device and the ram-air channel flap are adapted to regulate an airstream of ram air flowing through the ram-air channel in order to add ram air flowing through the ram-air channel to the boundary layer air upstream of the heat exchanger and thus before both the ram-air and the boundary layer air are fed to the heat exchanger to increase the cooling output of the cooling system when the closed-loop control device determines from the measuring data for the cooling system that removing the boundary layer air by suction through the air apertures is not efficient enough and thus the cooling output of the cooling system has to be increased;

wherein the boundary layer air that has been removed by suction and the ram air are used as a coolant that flows through the heat exchanger.

13. The fuel cell system of claim 12, wherein the suction unit comprises at least one of a pump and a compressor for removing by suction the boundary layer air.

14. The fuel cell system of claim 12, the cooling system further comprising:
a bypass channel for bypassing the heat exchanger.

15. The fuel cell system of claim 14,
wherein the bypass channel comprises a bypass flap that regulates an airstream flowing through the bypass channel such that the cooling output of the cooling system can be regulated.

16. The fuel cell system of claim 15, the cooling system further comprising:
a fan in the ram-air channel.

17. The fuel cell system of claim 14,
wherein the suction unit is arranged in a line near the bypass channel such that the suction unit can also be used for taking in the ram air.

18. The fuel cell system of claim 12,
wherein the suction unit is arranged in a line downstream of the heat exchanger.

* * * * *